United States Patent [19]
Gath et al.

[11] Patent Number: 4,776,256
[45] Date of Patent: Oct. 11, 1988

[54] HYDRAULIC FORCE BOOSTER

[75] Inventors: Dietmar Gath, Schoeffengrund; Peter Grone, Frankfurt am Main, both of Fed. Rep. of Germany

[73] Assignee: Alfred Teves GmbH, Frankfurt am Main, Fed. Rep. of Germany

[21] Appl. No.: 4,162

[22] Filed: Jan. 15, 1987

[30] Foreign Application Priority Data

Jan. 15, 1986 [DE] Fed. Rep. of Germany ....... 3600924

[51] Int. Cl.⁴ ............................................. F15B 9/10
[52] U.S. Cl. ....................................... 91/384; 60/551; 91/391 R
[58] Field of Search ................ 60/534, 591, 547.1, 60/547.2, 547.3, 548, 551; 91/368, 384, 391 R

[56] References Cited

U.S. PATENT DOCUMENTS

| | | | |
|---|---|---|---|
| 4,462,300 | 7/1984 | Belart | 60/551 |
| 4,657,312 | 4/1987 | Burgdorf | 60/534 |
| 4,659,152 | 4/1987 | Reinartz | 60/591 |

Primary Examiner—Abraham Hershkovitz
Attorney, Agent, or Firm—James B. Raden; Robert P. Seitter

[57] ABSTRACT

A hydraulic force booster for actuating master cylinder pistons in brake systems of automotive vehicles, comprises a lever system including two levers (33,34) pivotably interconnected by way of a journal (35). The second lever, by way of a coupling (45) is in communication with a set element (46) provided at the control piston (13) of a brake valve (9). The coupling (45) comprises a coupling element (53) provided at the second lever (34), and at least one guide surface provided at the set element (46) is connected to the control piston (13) by way of joint (47) and, at the other end, by providing another joint (48), is guided in a substantially co-axial housing bore (49). The coupling element (53) can be formed by a loose roller thereby substantially precluding that transverse forces be exerted on the control piston (13) of the brake valve (9) likely to result in lockings.

3 Claims, 2 Drawing Sheets

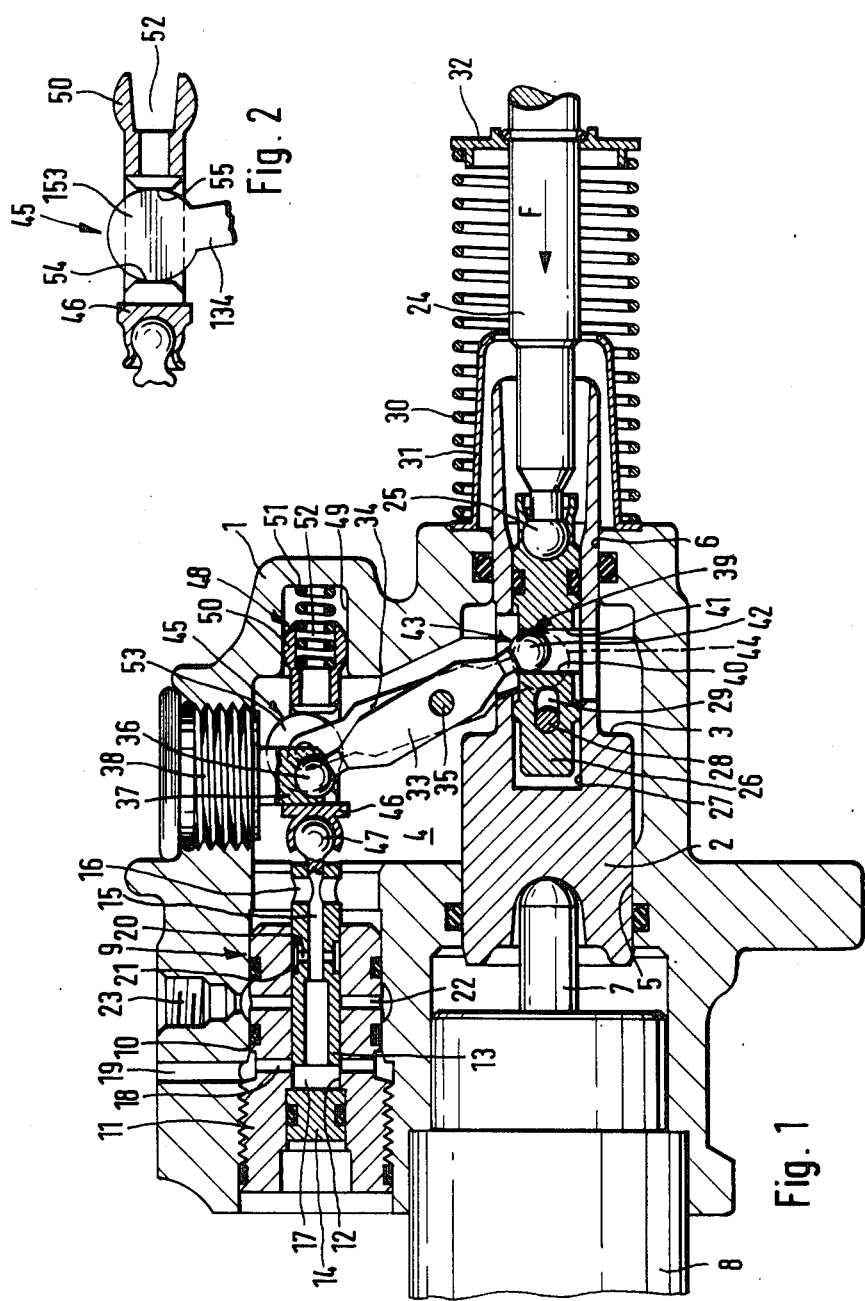

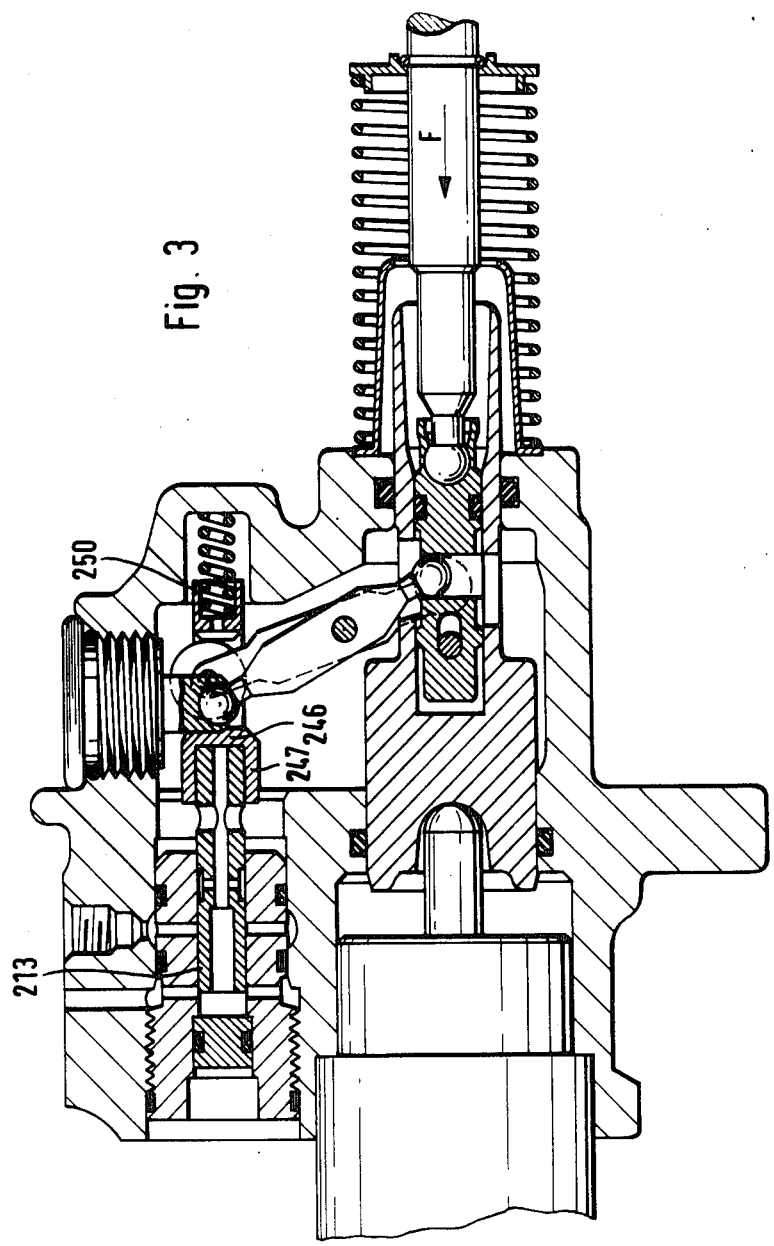

HYDRAULIC FORCE BOOSTER

BACKGROUND OF THE INVENTION

The present invention relates to a hydraulic force booster particularly applicable to actuating master cylinder pistons in brake systems of automotive vehicles, comprising a booster piston and a brake valve disposed in parallel thereto the spring-loaded control piston of which, by a lever system, is displaceable by an actuating rod, with two levers midway of their length, by way of a journal, being pivotably interconnected. The first lever, at the first end thereof, is rigidly supported on the housing and, at the second end thereof, by way of a first coupling, being captured by the actuating rod, and with the second lever, at the first end thereof, is pivotably supported on the booster piston and, at the second end thereof, by way of a second coupling, is in engagement with a set element connected to the control piston. The couplings respectively comprise a coupling element and at least one guiding surface cooperating therewith and including a transverse component.

In a conventional construction of this type (DE-OS No. 08 908), the set element, by way of a sleeve, is rigidly connected to the free end of the control piston of the brake valve. The spring loading the control piston is disposed in the space between the valve body of the brake valve and a stop on the control piston in the vicinity of the sleeve. The second coupling is formed by a cylindrical pin on the set element and by a longitudinal slot provided on the second lever and extending longitudinally of the lever. To safeguard a satisfactory operation of the brake valve and preclude losses, the control piston is seated with a close slide fit in the valve body. The close fit, occasionally, resulted in a locking of the control piston.

It is an object of the invention to provide a hydraulic force booster of the above-described type, minimizing the locking risk of the control piston in the valve body.

SUMMARY OF THE INVENTION

This problem, in the practice of the invention, is solved in that the guide surface of the second coupling is formed on the set element and extends in a direction vertical to the axis of the said set element, that the appertaining coupling element is provided on the second lever, and that the set element, by way of a first joint, is connected to the control piston and, at the end facing away from the control piston, with a second joint inserted, is guided in a substantially coaxial housing bore.

This construction allows only axial forces to be exerted on the control piston while transverse forces likely to result in locking the control piston are substantially or completely precluded. If the second lever is swung, substantially only axial forces will be transmitted by way of the guide surfaces extending in a direction vertical to the axis of the set element. This is in opposition to the conventional longitudinal slot provided in the lever which permits, in the same manner as do the guide faces, a relative movement between lever and set element; however, it enables only a force transmission in the direction of the tangent of the lever movement to be performed so that occurrence of a transverse force component is unavoidable. Due to the additional support in the housing bore, the residual transverse force acting upon the control piston is further reduced. However, it is likely for the axis of the housing bore to be staggered over the axis of the bore in the valve body. To preclude the staggered relationship resulting in new transverse forces, the set element is pivotally held at both ends. The new construction not only substantially reduces the number of brake valve failure but rather also substantially increases the life of the brake valves and, hence, of the appertaining boosters. To form the second joint a pivot head provided on the set element can be guided in the housing bore thereby providing a particularly simple form of embodiment.

An alternative solution to the same problem which can also be employed is provided in that the guiding surface of the second coupling is formed on the set element and extends in a direction vertical to the axis of the said set element, that the appertaining coupling element is provided on the second lever and that the coupling on the second lever is formed by at least one roller rotatably disposed on the lever.

With the aid of the roller even the minor transverse force component can be eliminated which, as a result of friction between coupling element and guiding surface could be transferred to the control piston.

In a preferred embodiment, the spring loading the control piston is disposed between the end of the set element facing away from the control piston and the housing. As the free end of the control piston protruding from the valve body will no longer have to be surrounded by the spring, the said free end may be substantially shorter. The lever arm, by way of which transverse forces, if any, possibly still transferred by way of the coupling, act on the work portion of the control piston contained in the bore of the valve housing can, therefore, be reduced length to thereby safety preclude disturbing locking moments.

Advantageously, the end of the control element facing away from the control piston, comprises a depression containing a part of the spring thereby safeguarding a reliable attachment of the spring to the set element during assembly and operation.

BRIEF DESCRIPTION OF THE DRAWING

The invention will now be described in greater detail with reference to preferred embodiments as illustrated in the drawing wherein:

FIG. 1 is a longitudinal section through a first form of embodiment of a booster as provided by the invention;

FIG. 2 shows the set element of FIG. 1 with a modified coupling; and,

FIG. 3 is a longitudinal section through a second form of embodiment.

DETAILED DESCRIPTION OF THE DRAWING

Referring now to FIG. 1, in a housing 1 a stepped booster piston 2 is provided step 3 of which faces a pressure chamber of the booster and which, at both sides of the step, is guided in coaxial bores 5 and 6 of housing 1. By way of push rod 7, the piston of a master cylinder contained in an insert 8 can be displaced.

A housing bore 10 extending in parallel in bores 5 and 6, serves to accommodate a brake valve 9. A valve body 11 is inserted, preferably screwed, into the said housing bore 10. In bore 12 thereof, a control piston 13 of the brake valve 9, is displaceable therein with a close sliding fit. Bore 12 is sealed by a stopper 14. Control piston 13 is provided with a passageway 15 which, by way of radial bores 16, is in communication with the pressure chamber 4 and (a) is in communication by way of the front-sided space 17 and radial channel 18 in the valve body 11 with a connection 19 leading to the return tank; (b) is in communication with a pressure-carrying connection 23 by way of radial channels 20 in the control piston, an annular groove 21 coupled thereto and radial channels 22 in the valve body 11; or (c) can be separated from the two connections in an intermediate position.

An actuating rod 24 normally in communication with a brake pedal, by way of which force F can be exerted, by way of a ball-and-socket joint 25, is in communication with a slide valve 26 guided in a bore 27 of the booster piston 2. A backlash coupling composed of a pin 28 on the booster piston 2 and an elongated hole 30 on the slide valve 26, limits the relative movement between the actuating rod 24 and the booster piston 2. A reset spring 30 which, by inserting a guide portion 31, is supported on housing 1 and, by inserting a supporting member 32, is supported on the actuating rod 24, respectively returns the arrangement into the initial position.

A lever arrangement having two levers 33 and 34 pivotally interconnected by journal 35, serves to actuate the brake valve 9 under the influence of the actuating rod 24 and position of the booster piston 2. The first lever 33 in the one end thereof, by way of a ball-and-socket joint 36, the bearing bush 37 of which is provided on a screw-in connecting piece 38, is rigidly supported on the housing. The other end, by way of a coupling 39, can be caught by the slide valve 26 of the actuating rod 24. The coupling 39 is made up of two guide faces 40 and 41 provided on valve 26 and extending in a direction vertical to the axis, and a coupling element 42 provided on the first lever 33. The said coupling element especially is of a spherical or cylindrical plate-type configuration. The second lever 34 at the lower end thereof, by way of a similarly configured coupling 43, is in commnication with the booster piston 2. As the said coupling, in FIG. 1, is concealed, only the coupling element 44 has been drawn in broken lines, while the guide faces provided at the outer side of the hollow cylindrical part of the booster piston 2 and equally extending in a direction vertical to the axis, are not shown.

The other end of the second lever 34, by way of a coupling 45, is connected to a set element 46 which, in turn, by way of a ball-and-socket joint 47, is in communication with the control piston 13 of the brake valve 9. The end of the set element 46 facing away from the control piston, by way of another joint 48, is guided in a housing bore 49. The said joint is formed in simple manner in that a pivotable head 50 is provided on the set element 46, fitting into the housing bore 49. A compression spring 51 loading the control piston 13 is inserted into a depression 52 of the set element 46 and is supported on the bore bottom. The coupling 45 includes a coupling element 53 provided on the second lever 34 which cooperates with the guide faces 54 and 55 on the set element (see FIG. 2). The guide faces 54 and 55 extend in a direction vertical to the axis of the set element 46. The coupling element 53 according to FIG. 1 is configured as a roller loosely supported on the lever 34 whereas the coupling element 153 illustrated in FIG. 2 is integrally connected to lever 134.

In the embodiment according to FIG. 3, all parts correspond to the example of embodiment according to FIG. 1. The only difference resides in that the set element 246, by way of a sleeve 247, is rigidly connected to the control piston 213, and that the other end 250 of the set element 246 is not guided, i.e., the set element is floatingly supported.

If during operation of the force booster according to FIG. 1, the actuating rod 24 is displaced to the left, the first lever 33 swings about the ball-out-socket joint 36, with the journal 35 being displaced to the left. As the coupling 43 is held by the booster piston 2, the second lever 34 swings in counter-clockwise direction, guiding the set element 46 and the control piston 13 of the brake valve to the left thereby establishing the communication between the pressure connection 23 and the pressure chamber 4. As a result of the pressure increase, the booster piston 2 displaces to the left, with the second lever 34 being swung back about the journal 35 thereby causing the control piston 13 to occupy an intermediate position in which the pressure chamber 4 is sealed outwardly. Any additional displacement of the actuating rod 24 results in that the booster piston 2 follows the rod movement with a correspondingly increased force. When releasing the actuating rod 24, the same returns under the influence of the reset spring 30 to the resting position, with all parts being returned to the initial position as shown.

Although the coupling element 53 of the coupling 45 is not moved in the axial direction of the control piston 13, the transverse forces transferred to the control piston likely to result in lockings in the bore 12, are negligible. This is due to the fact that the guide surfaces 54 and 55 extend in a direction vertical to the axis of the set element 46 thus being capable to transfer substantially only axial forces. To the extent that in a coupling element rigidly connected to the lever (FIG. 2) transverse forces occur due to friction, these, in part, are absorbed by housing 1 by way of the second joint 48. As the set element 46 is pivotably supported at both ends, axial displacements between the control piston 13 and the housing bore 49 are irrelevant. Moreover, such transverse forces caused by friction, can also be precluded by employing the loose roller as shown in FIGS. 1 and 3, as the coupling element 53. As the spring 51 engages the end of the set element 46 facing away from the control piston 13, thus not needing any space between the valve body 11 and the set element 46, the portion of the control piston 13 freely protruding from the valve body 11, may be of short length. The movement possibly to be attributed to transverse forces, will be correspondingly low. It is, therefore, unlikely for cants or lockings to occur.

What is claimed is:

1. A hydraulic force booster for actuating master cylinder pistons in brake systems of automotive vehicles, comprising a booster piston and a brake valve disposed in parallel thereto, a spring loaded control piston thereof is displacable by an actuating rod by way of a lever system, with two levers being pivotably interconnected midway of their length by way of a journal, with the first lever at the first end thereof being rigidly supported on the housing and, at the second end thereof, being caught by the actuating rod by way of a first coupling, and with the second lever, at the first end thereof, being pivotably supported on the booster piston and, at the second end thereof, by way of a second coupling, being in engagement with a set element connected to the control piston, and with the couplings comprising respectively one coupling element and at least one guide surface cooperating therewith and comprising a transverse component, wherein said one guide surface (54, 55) of the second coupling (45) is formed on the set element (46) and extends in a direction vertical to the axis of said set element, wherein an appertaining coupling element (54; 153) is provided on the second lever (35; 135), and wherein the set element (46) is connected, by way of a first joint (47), to the control piston (13) and, at the end facing away from the control piston, by inserting a second joint (48), guided in a substantially coaxial housing bore (49).

2. A force booster according to claim 1, wherein a pivot head (50) provided on the set element (46) is guided in a housing bore (49) to form the second joint.

3. A hydraulic force booster for actuating of master cylinder pistons in brake systems for automotive vehicles, comprising a booster piston and a brake valve disposed in parallel thereto, a spring-loaded control piston thereof, by way of a lever system, is displaceable by an actuating rod, with two levers being pivotably interconnected midway of their length by way of a jornal, with the first lever, at the one end thereof, being rigidly supported on the housing and, at the second end thereof, being captured by the actuating rod by way of a first coupling, and with the second lever, at the first end thereof, being pivotably supported on the booster piston and, at the second end thereof, by way of a second coupling, being in engagement with a set element connected to the control piston, with the couplings including respectively one coupling element and at least one guide surface cooperating therewith and comprising a transverse component wherein said one guide surface (54, 55) of the second coupling (45) is formed on the set elememt (46) and extends in a direction vertical to the axis of the set element, wherein an appertaining coupling element is provided at the second lever, wherein the coupling element (53) is formed on the second lever (34) by at least one roller rotatably disposed on the lever, and wherein the spring (51) loading the control piston (13) is located between the end of the set element (46) facing away from the control piston and the housing (1).

* * * * *